Nov. 22, 1966 JAMES E. WEBB 3,287,496
ADMINISTRATOR OF THE NATIONAL AERONAUTICS
AND SPACE ADMINISTRATION
DIGITAL TELEVISION CAMERA CONTROL SYSTEM
Filed Nov. 5, 1963 2 Sheets-Sheet 1

INVENTOR.
LEONARD R. MALLING
BY
ATTORNEYS

Nov. 22, 1966 JAMES E. WEBB 3,287,496
ADMINISTRATOR OF THE NATIONAL AERONAUTICS
AND SPACE ADMINISTRATION
DIGITAL TELEVISION CAMERA CONTROL SYSTEM
Filed Nov. 5, 1963 2 Sheets-Sheet 2

INVENTOR.
LEONARD R. MALLING
BY
[signature]
O. C. Keavency
ATTORNEYS

United States Patent Office 3,287,496

Patented Nov. 22, 1966

3,287,496

DIGITAL TELEVISION CAMERA CONTROL SYSTEM

James E. Webb, Administrator of the National Aeronautics and Space Administration, with respect to an invention of Leonard R. Malling Filed Nov. 5, 1963, Ser. No. 321,656
9 Claims. (Cl. 178—7.2)

This invention relates generally to television camera systems and more particularly to means for automatically adjusting system parameters in accordance with the amount of light available from the camera field of view in order to maintain a suitable range of contrast.

Various television camera tubes are known in the prior art and most are characterized by the inclusion of target means which convert a light intensity pattern in the field of view of the camera tube, to an electrically represented image. The image is capable of being read by a scanning electron beam which coacts with the image to form a modulated video output signal. Typical of such television camera tubes are the image orthicon tube and the vidicon tube. Although the teachings of the invention herein are broadly applicable to most any type of television camera tubes, principal attention herein will be directed toward the vidicon tube, for exemplary purposes only.

In a vidicon camera tube, a charge density pattern representative of the light intensity pattern in the field of view, is formed by photoconduction on the target means of the tube. The target means includes a transparent conductive film and a deposited photoconductive surface adhered thereto and the charge density pattern is stored on the photoconductive surface. In order to read the information in the pattern, an electron beam, usually consisting of low velocity electrons, is generated and caused to sequentially trace scanning lines, displaced from one another, across the photoconductive surface.

Each element of the photoconductive surface is an insulator when not in the presence of light, but becomes slightly conductive when illuminated from the field of view through the transparent conductive film. That is, when light strikes the image (transparent conductive film) side of the target, the elements in the photoconductive surface become slightly conductive so that the side thereof remote from the conductive film becomes slightly more positive, rising toward the potential on the conductive film because of the lowered resistance of the photoconductive surface. The greater the light intensity incident on any part of the transparent conductive film, the more positive the side of the photoconductive surface element remote from the transparent conductive film becomes. As a result, the photoconductive surface develops a positive charge pattern, corresponding to the picture elements of the optical image. As this image is scanned by the electron beam, electrons in the beam striking the target are deposited until the potential on the photoconductive surface is reduced to the voltage of the cathode supplying the electron beam. As electrons are deposited on the photoconductive surface to neutralize its positive charge, capacitive signal current flows through the target circuit load resistance connected between the electron beam source (cathode) and the conductive film.

As the illumination level on the vidicon camera tube target is increased and approaches the saturation level, it is necessary to reduce the potential on the transparent conductive film in order to avoid picture smearing and charge pattern instabilities created by the high signal current through the photoconductive surface. Conversely, for low levels of illumination, the target current and hence the conductive film potential, should be high in order to obtain the best signal-to-noise ratio. In the use of a vidicon camera tube, situations are often encountered where the light intensity pattern in the field of view varies widely. This is particularly true where the vidicon camera tube is utilized in interplanetary missions to televise celestial objects. Essentially, the vidicon camera tube must properly perform three separate functions if high quality pictures are to be assured; i.e. It must (1) detect the optically imaged light pattern, (2) electrically store the the charge pattern produced by the light pattern, and (3) amplify the current caused by photoconduction.

In view of the necessity of adjusting the television camera system in accordance with the intensity of available light, it is an object of the present invention to provide control means for use in conjunction with television camera tubes which means function to adjust system parameters so as to prevent excessive excursions of video output signals even in the presence of extreme variations in light intensity in the camera tube field of view.

Between the development of video output signals representative of successive picture frames, it is necessary when utilizing certain types of camera tubes to erase the charge pattern stored in the tube. In order to do this, it is conventional practice to utilize an erase lamp for this purpose. The lamp is illuminated in order to clear the camera tube of any stored charge. It is essential that the lamp be illuminated only for a period sufficient to clear the stored charge and not for a period which would result in an overerased condition. Of course, the time duration which it is necessary to maintain the erase lamp "on" depends on the light intensity level to which the target of the camera tube was exposed. Consequently, it is an additional object of the present invention to provide control means for use in conjunction with television camera tubes for adjusting the "on" time of an erase lamp.

Briefly, the invention herein is directed to means responsive to video signals derived from a television camera tube for maintaining the video output signal level within certain optimum limits even in the presence of extreme variations in the light intensity derived from the camera tube field of view. Regulation of the video output signal is effected by varying a scale factor relating the light intensity to the level of the video output signal.

In a first embodiment of the invention, the scale factor is varied by controlling the gain of a vidicon tube. Tube gain is controlled by establishing a potential on the target conductive film whose magnitude is determined in accordance with the state of a bi-directional counter. The counter is either incremented or decremented or not changed at the end of each picture frame dependent upon whether the peak highlight in the frame is above, below, or within a certain range. The video output signal is integrated over several picture elements so that the integration time is sufficiently long to discriminate against random noise signals and sufficiently short to determine the peak frame highlight.

In a second embodiment of the invention, in lieu of controlling the scale factor by varying the target potential in accordance with the counter state, the scale factor is controlled by varying the time the tube target is exposed to the field of view. The exposure time is varied by varying the speed at which a shutter, positioned between the camera tube target and the field of view, operates.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
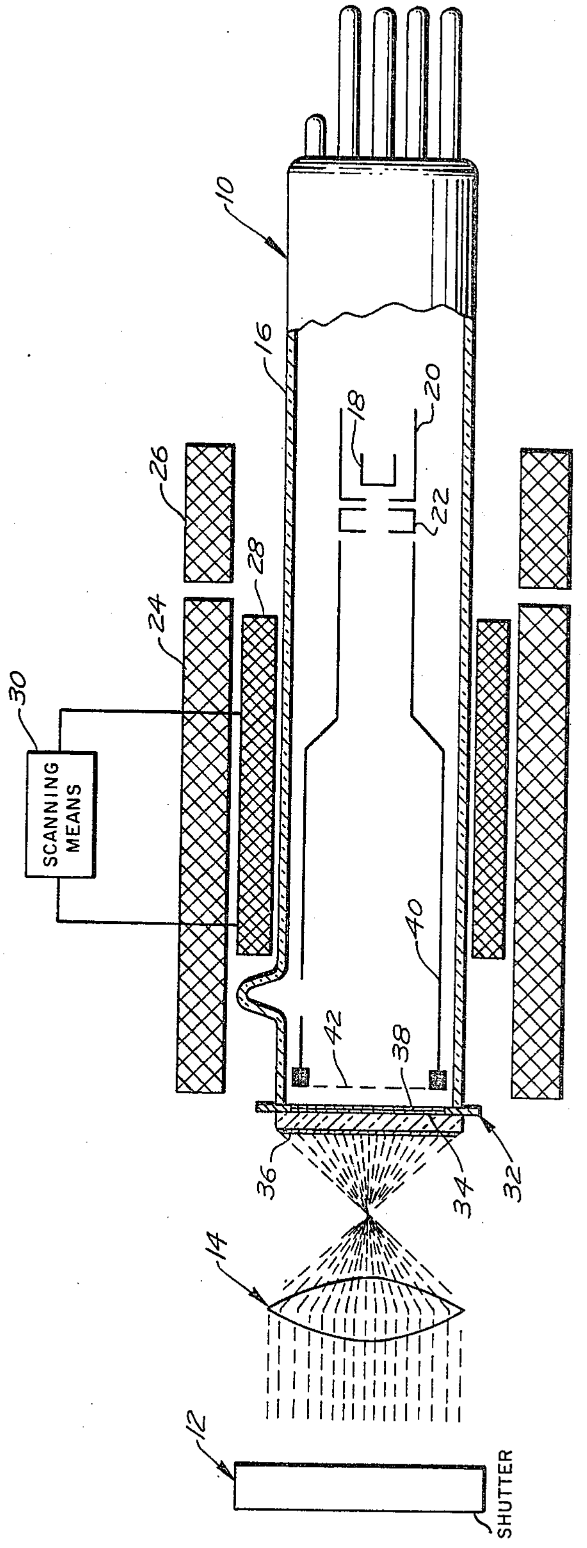
FIGURE 1 is a schematic diagram of a conventional vidicon camera tube.

Attention is now directed to FIGURE 1 which illustrates a television camera system utilizing a vidicon camera tube 10. In addition to the vidicon camer tube 10, a shutter apparatus 12 is provided to enable the vidicon camera tube to be selectively exposed to a subject in the field of view, and an optical lens apparatus 14 utilized for properly focusing the subject with respect to the vidicon tube.

The vidicon camera tube includes a substantially cylindrical glass envelope 16 having a cathode 18 positioned therein for generating an electron beam. A first grid 20 is provided for controlling the Z axis of the tube (frame timing logic) and a second grid 22 is provided for accelerating the electrons provided by the cathode 18. In addition, a focusing coil 24 and electron beam alignment coil 26 are generally provided in conventional vidicon tubes. Further, vertical and horizontal deflection coils 28, connected to a scanning means 30, surround the glass envelope 16 and functions to cause the electron beam provided by cathode 18 to trace a scanning raster with respect to a target electrode 32. The target electrode 32 consists of a transparent conductive film 34 positioned adjacent the inner sufrace of a glass face plate 36. A photoconductive surface 38 is adhered to the conductive film on the side thereof remote from the glass face plate. In addition, the vidicon tube is usually provided wtih third and fourth grids 40 and 42 utilized for focusing the beam.

As previously noted, the vidicon camera tube functions to provide a video output signal carrying information representative of the light intensity pattern in the field of view to which the vidicon tube target is exposed. That is, when the shutter apparatus 12 permits a light intensity pattern to fall on the target electrode 32, the resistance of elements on the photoconductive surface 34 exposed to illumination, will decrease significantly. If a positive potential is applied to the conductive film 34, the electron beam current will be greater when, in tracing its scanning raster, it terminates on an element having a reduced resistance. Consequently, the electron beam current is modulated by the photoconductive image formed on the surface 38, which constitutes an electrical representation of the light intensity pattern in the field of view of the camera tube. The modulation of the electron beam current can be sensed by measuring the signal variation in a load resistor connected in series between the conductive film voltage source and the cathode 18. It should be apparent that if a constant voltage is applied to the conductive film 34, the light intensity in the camer tube field of view is related to the magnitude of the video output signal derived across the load resistor by some constant scale factor. In accordance with the invention herein, in order to maintain the video output signal level in an optimum range, the scale factor relating the light intensity to the video output signal magnitude is varied as a function of the light intensity.

Figure 2:
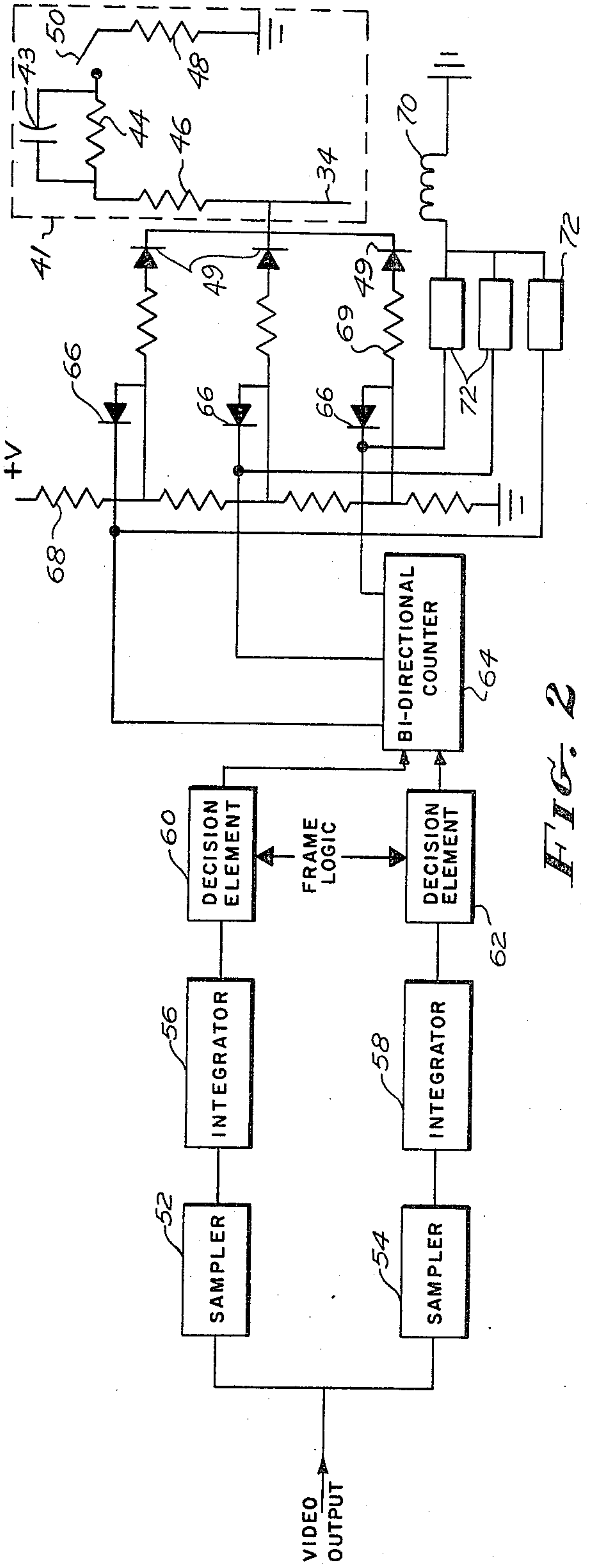
FIGURE 2 is a schematic block diagram of a first embodiment of the present invention.

Consider the initial embodiment of the invention shown in FIGURE 2 in which the circuit 41 represents the equivalent vidicon electron beam circuit, the equivalent circuit having lumped constants in place of distributed values. The circuit constants consist of a parallel combination of capacitance 43 and resistance 44 connected in series with a load resistance 46 and the electron beam 48. The resistance 48 is illustrated as being connected to a source of reference potential, as ground, which represents the source of potential to which the cathode of the vidicon tube of FIGURE 1 is connected. The resistor 46 is connected to the conductive film 34. A source of potential, schematically illustrated as the output of an Or gate comprised of diodes 49 is connected to the junction between the resistor 46 and the conductive film 34. The electron beam is switched either on or off by one of the control grids which is represented by the switch 50.

As indicated, a video output signal is developed by means connected to the load resistor 46 such that the magnitude of the video output signal increases as the light intensity incident on the conductive film 34 increases. The video output signal is respectively coupled through first and second sampler gates 52 and 54 to first and second integrator circuits 56 and 58. The outputs of the integrator circuits 56 and 58 are respectively coupled to first and second decision elements 60 and 62, each of which can comprise a threshold flip-flop. The output of the decision element 60 is connected to an incrementing input terminal of a bi-directional counter 64 and the output of the decision element 62 is connected to the decrementing input terminal of the bi-directional counter 64. The counter 64 is a multi-stage counter having a plurality of output terminals. A true output signal is applied to a different output terminal for each state which the counter 64 can possibly assume. Each of the counter output terminals is connected to the cathode of a different diode 66. The anode of each diode 66 is connected to a tap connected to a different point on a voltage divider network 68 and through a resistor 69 to the anode of a different diode 48. In operation all of the output terminals of the counter 64, except one, are at a potential approximately equal to ground. The one terminal identified by the counter state will be at a high potential which will thereby cause the potential at the voltage divider tap associated therewith to be applied to the film 34.

In the operation of the embodiment of FIGURE 2, the video output signal is continuously sampled during successive periods, each period comprising an interval in which the electron beam of the camera tube is able to scan over several picture elements. The integrator circuits 56 and 58 integrate the video output signal over this several picture element period. The integration occurs continuously throughout a full frame readout time, i.e. the time required for the electron beam to trace a full scanning raster with respect to the target electrode 32. The integration establishes one of three conditions: namely, that the video output signal is either normal, too high, or too low. The integration time of the video signal as noted, covers several picture elements which time is sufficiently short to determine the peak highlight in a given frame, while it is sufficiently long to discriminate against random noise signals. The flip-flop decision elements 60 and 62 are operated by the frame logic signals at the end of each frame to determine whether in fact the video signal was normal, too high, or too low. If the signal was too high, the decision element 60 provides an output signal which functions to increment the bi-directional counter. On the other hand, if the video output signal was too low, the decision element 62 decrements the bi-directional counter 64. The state of the counter of course determines the potential applied to the conductive film 34. That is, if the light intensity to which the camera tube is exposed is high, the gain of the camera tube is preferably relatively low or in other words the potential applied to the film 34 should be low. On the other hand, when the light intensity incident on the camera tube target is low, the potential applied to the film 34 should be relatively high. Thus, it should be realized that the embodiment of FIGURE 2 functions to modify the scale factor between the light intensity incident on the camera tube and the video output signal magnitude developed as a function of that light intensity.

In several types of camera tubes, it is necessary to erase information stored on the photoconductive surface 34 between frames. Erasure is usually accomplished by illuminating an erase lamp 70 for an interval sufficient to erase any stored information but insufficient to overerase such information. Of course, if the camera tube is exposed to higher intensity light, the erase lamp 70 must be illuminated for a longer period, to permit it to fully erase the photoconductive surface 38, then if the surface had been exposed to relatively low intensity light. In order to vary the erase lamp "on" time in accordance with the light intensity incident on the tube target, each counter output terminal is connected to the input of a different delay multivibrator 72. Consequently, in response to the one of the conduct output terminals displaying a high potential, an associated delay multivibrator 72 will be switched to its unstable state for a period determined by its circuit parameters. Thus, for each state of the bi-directional counter 64, the erase lamp 70 will be turned on at the end of each frame for a period whose duration is determined by the state of the counter.

Figure 3:
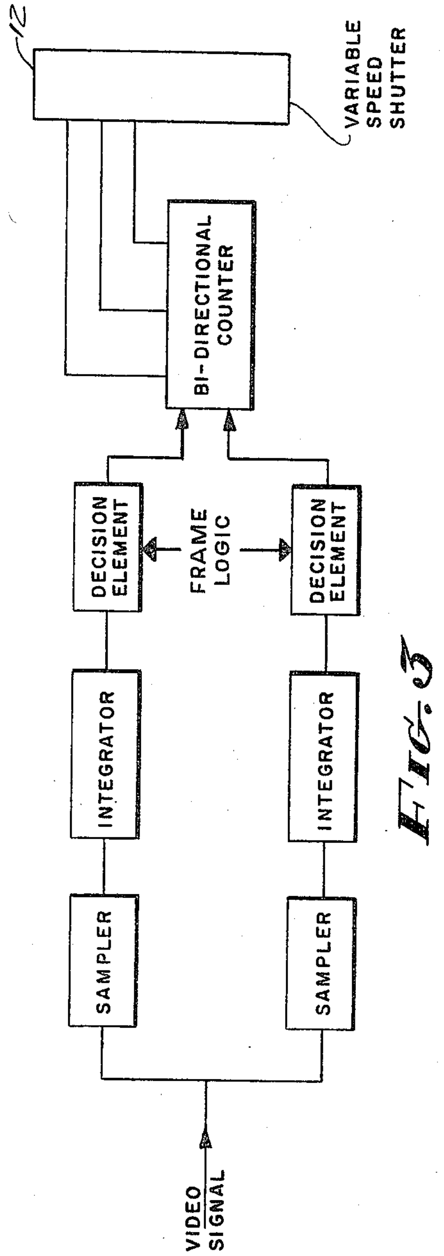
FIGURE 3 is a schematic block diagram of a second embodiment of the present invention.

Attention is now called to the second embodiment of the invention illustrated in FIGURE 3. It should be apparent at this point that the nature of the control apparatus introduced herein involves modifying the scale factor between the light intensity and the video output signal in response to excursions of the video output signal. The embodiment of FIGURE 3 is substantially identical to that of FIGURE 2 except however that in lieu of modifying the gain of the camera tube, as by applying a different source potential to the film 34, the shutter apparatus 12 is operated at different speeds dependent upon the state of the bi-directional counter. Thus, the scale factor between the field of view light intensity and the magnitude of the video output signal is varied by modifying the time duration during which the camera tube target is exposed to the field of view. The latter embodiment of the invention shown in FIGURE 3 is extremely advantageous inasmuch as it enables the teachings of the invention to be applied equally as well to all types of camera tubes regardless of whether or not the gain of the tube is easily controllable. The embodiment of FIGURE 2 of course depends upon controlling the camera tube gain.

From the foregoing, it should be apparent that a control system has been disclosed herein for utilization with television camera systems which control system functions to automatically adjust the camera system for variations in field of view light intensities. As an example of experimental results achieved through the use of the present invention, the level of a camera tube video output signal has been maintained within a 2 to 6 volt range over a 64 to 1 variation in frame highlights, without any loss of sensitivity or picture smearing.

What is claimed is:

1. In combination with a television camera tube which provides a video output signal whose voltage level is proportionately related to the light intensity available from the camera tube field of view by a scale factor, means for limiting extreme voltage excursions of said output signal even in the presence of extreme variations in said light intensity, said means including a bi-directional counter; means responsive to the peak output signal level in successive time periods for incrementing said counter for each period in which said peak output signal exceeds a first threshold level and for decrementing said counter for each period in which said peak output signal is below a second threshold level; and feedback means responsive to each state of said counter for establishing a different scale factor.

2. The combination of claim 1 wherein said camera tube comprises a vidicon having a target element including a transparent conductive film; and said feedback means includes means for applying a different potential to said conductive film in response to each different state of said counter.

3. The combination of claim 1 wherein said camera tube has a target and a shutter is positioned adjacent said target; and said feedback means includes means for operating said shutter at a different speed in response to each different state of said counter.

4. The combination of claim 1 wherein said camera tube includes a target on which is generated an electrically represented image representative of the light intensity pattern in said field of view; means for causing an electron beam to scan across said image to generate a video output signal modulated in accordance with the characteristics of said image; and means for integrating said video output signal over periods which are sufficiently short to thereby represent said peak output signal level and sufficiently long to discriminate against random noise signals.

5. The combination of claim 1 wherein said camera tube includes a target on which is generated an electrically represented image representative of the light intensity pattern in said field of view; erase lamp means for erasing said image from said target; and means responsive to each state of said counter for actuating said erase lamp means for different durations.

6. Television camera apparatus including a camera tube having a target exposed to a field of view and being responsive to a light intensity pattern in said field of view for generating an electrically represented image representative of said light intensity pattern; means for generating an electron beam and for causing said beam to successively trace a frame of scanning lines, displaced from one another, across said image, each of said scanning lines traversing very many picture elements; means responsive to said beam scanning said image for developing a video output signal modulated by said image; means for continually integrating said video output signal over several picture elements to develop a peak output signal; decision element means for comparing the magnitude of said peak output signal once each frame with the magnitude of first and second threshold signals; a bi-directional counter; and means for incrementing said counter whenever the magnitude of said peak output signal exceeds the magnitude of said first threshold signal and for decrementing said counter whenever the magnitude of said peak output signal is below the magnitude of said second threshold signal.

7. The apparatus of claim 6 wherein the magnitude of said video output signal is related by a proportionate scale factor to the light intensity pattern in said field of view; and means for varying said scale factor in response to the state of said counter.

8. The apparatus of claim 7 wherein said means for varying said scale factor includes means for varying the gain of said camera tube.

9. The apparatus of claim 7 wherein said means for varying said scale factor includes a shutter positioned adjacent said tube target; and means for operating said shutter at a speed determined by the state of said counter.

No references cited.

DAVID G. REDINBAUGH, *Primary Examiner.*

J. McHUGH, *Assistant Examiner.*